United States Patent
Wurth et al.

(10) Patent No.: US 10,974,818 B2
(45) Date of Patent: Apr. 13, 2021

(54) VORTEX GENERATOR ARRANGEMENT FOR AN AIRFOIL

(75) Inventors: Ines Wurth, Ludwigsburg (DE); Jesper Madsen, Gesten (DK); Rolf Hansen, Esbjerg V (DK); Olaf Muller, Harrislee (DE)

(73) Assignee: LM WIND POWER A/S, Kolding (DK)

( * ) Notice: Subject to any disclaimer, the term of this patent is extended or adjusted under 35 U.S.C. 154(b) by 399 days.

(21) Appl. No.: 14/233,930

(22) PCT Filed: Jul. 16, 2012

(86) PCT No.: PCT/EP2012/063915
§ 371 (c)(1),
(2), (4) Date: Apr. 2, 2014

(87) PCT Pub. No.: WO2013/014015
PCT Pub. Date: Jan. 31, 2013

(65) Prior Publication Data
US 2014/0219810 A1 Aug. 7, 2014

(30) Foreign Application Priority Data

Jul. 22, 2011 (EP) .................................... 11175051
Jul. 22, 2011 (EP) .................................... 11175052
Feb. 21, 2012 (GB) .................................... 1202894

(51) Int. Cl.
*B64C 23/06* (2006.01)
*F03D 1/06* (2006.01)
(52) U.S. Cl.
CPC ............ *B64C 23/06* (2013.01); *F03D 1/0675* (2013.01); *F05B 2240/132* (2013.01);
(Continued)

(58) Field of Classification Search
CPC ......... B64C 23/06; B64C 21/00; B64C 21/10; B64C 2230/26; B64C 2033/0226;
(Continued)

(56) References Cited

U.S. PATENT DOCUMENTS 4,655,419 A * 4/1987 van der Hoeven ..... B64C 23/06
244/200.1
4,674,717 A * 6/1987 Loebert .................. B64C 21/04
244/207
(Continued)

FOREIGN PATENT DOCUMENTS

EP 2 141 358 A1 1/2010
WO 00/15961 A1 3/2000
(Continued)

OTHER PUBLICATIONS

G.E. Miller, "Comparative performance test on the Mod-2, 2.5-mW wind turbine with and without vortex generators", N95-27978, Presented at the DOE/NASA Workshop on Horizontal Axis Wind Turbine Technology, Cleveland Ohio May 8-10, 1984. [retrieved from U.S. Appl. No. 12/563,686, filed Oct. 1, 2020] (Year: 1984).*

(Continued)

*Primary Examiner* — Craig J Price
(74) *Attorney, Agent, or Firm* — Nath, Goldberg & Meyer; Jerald L. Meyer; Tanya E. Harkins (57) ABSTRACT

A particular arrangement of vortex generators for an airfoil is described. The vortex generators are provided in pairs, preferably on a wind turbine blade, wherein by arranging the vortex generators according to specified characteristics, a surprising improvement in blade performance is provided over the prior art systems.

19 Claims, 7 Drawing Sheets

(52) U.S. Cl.
CPC ......... *F05B 2240/301* (2013.01); *Y02E 10/72* (2013.01); *Y02T 50/10* (2013.01)

(58) Field of Classification Search
CPC ................ F03D 1/0675; Y02E 10/721; F05B 2240/301; F05B 2240/132; Y02T 50/162; B64D 2033/0226
USPC ............... 416/235, 236 A, 236 R, 237, 228; 244/198, 199.1–199.4, 200.1; 137/808, 137/809; 296/180.1–180.5
See application file for complete search history.

(56) References Cited

U.S. PATENT DOCUMENTS

| | | | | |
|---|---|---|---|---|
| 4,696,442 | A * | 9/1987 | Mazzitelli | B64C 23/06 244/200.1 |
| 5,058,837 | A * | 10/1991 | Wheeler | B64C 23/06 244/198 |
| 5,386,955 | A * | 2/1995 | Savill | B63B 1/34 138/38 |
| 5,785,282 | A * | 7/1998 | Wake | B64C 27/463 244/130 |
| 5,788,191 | A * | 8/1998 | Wake | B64C 27/463 244/199.2 |
| 6,105,904 | A * | 8/2000 | Lisy | B64C 3/58 244/130 |
| 7,337,831 | B2 * | 3/2008 | Torii | F28F 1/32 165/109.1 |
| 7,857,597 | B2 * | 12/2010 | Anjuri | F03D 1/06 416/228 |
| 7,878,457 | B2 * | 2/2011 | Narramore | B64C 23/06 244/200.1 |
| 7,914,259 | B2 * | 3/2011 | Godsk | F03D 1/0641 416/146 R |
| 7,927,070 | B2 * | 4/2011 | Godsk | F03D 1/0633 416/147 |
| 7,927,078 | B2 * | 4/2011 | Parsania | F03D 1/0675 416/228 |
| 8,047,801 | B2 * | 11/2011 | Fang | F03D 1/0633 416/235 |
| 8,162,590 | B2 * | 4/2012 | Haag | F03D 1/0633 415/4.3 |
| 8,172,178 | B2 * | 5/2012 | Bonnaud | B64C 23/06 244/117 A |
| 8,656,957 | B2 * | 2/2014 | Babinsky | F15C 1/16 137/809 |
| 8,746,053 | B2 * | 6/2014 | Brake | F03D 1/0608 73/147 |
| 8,870,124 | B2 * | 10/2014 | Ireland | B64C 23/06 244/200.1 |
| 9,039,381 | B2 * | 5/2015 | Grife | F03D 1/0675 416/236 R |
| 9,051,919 | B2 * | 6/2015 | Jensen | F03D 1/0608 |
| 9,057,359 | B2 * | 6/2015 | Fuglsang | F03D 1/0675 |
| 9,133,816 | B2 * | 9/2015 | Jensen | F03D 1/0608 |
| 9,273,667 | B2 * | 3/2016 | Enevoldsen | F03D 1/0633 |
| 9,476,406 | B2 * | 10/2016 | Obrecht | F03D 1/0633 |
| 9,523,279 | B2 * | 12/2016 | Herr | F03D 1/0633 |
| 9,759,186 | B2 * | 9/2017 | Grabau | F03D 1/0633 |
| 9,777,703 | B2 * | 10/2017 | Madsen | F03D 7/0244 |
| 9,932,960 | B2 * | 4/2018 | Petsche | F03D 1/0683 |
| 10,400,744 | B2 * | 9/2019 | Herrig | F03D 1/0641 |
| 10,443,563 | B2 * | 10/2019 | Fukami | F03D 1/0633 |
| 2004/0129838 | A1 * | 7/2004 | Lisy | B64C 23/06 244/204.1 |
| 2007/0018056 | A1 * | 1/2007 | Narramore | B64C 23/06 244/200.1 |
| 2008/0175711 | A1 | 7/2008 | Godsk et al. | |
| 2008/0217485 | A1 * | 9/2008 | Ikeda | B64C 23/06 244/204.1 |
| 2009/0068018 | A1 * | 3/2009 | Corten | F03D 1/0641 416/223 R |
| 2010/0008787 | A1 | 1/2010 | Godsk | |
| 2010/0209258 | A1 * | 8/2010 | Fuglsang | F03D 1/0633 416/90 R |
| 2011/0110777 | A1 * | 5/2011 | Abdallah | F03D 1/0608 416/23 |
| 2011/0229321 | A1 * | 9/2011 | Kilaras | F03B 3/121 416/1 |
| 2012/0057984 | A1 * | 3/2012 | Fuglsang | F03D 1/0641 416/234 |
| 2012/0151769 | A1 * | 6/2012 | Brake | F03D 1/0608 29/889.71 |
| 2013/0108457 | A1 * | 5/2013 | Thrue | F03D 1/0641 416/236 R |
| 2013/0129520 | A1 * | 5/2013 | Enevoldsen | F03D 1/0633 416/235 |
| 2014/0140856 | A1 * | 5/2014 | Madsen | F03D 1/001 416/236 R |
| 2014/0317900 | A1 * | 10/2014 | Desroche | B64C 23/06 29/401.1 |
| 2015/0010407 | A1 * | 1/2015 | Zamora Rodriguez | F03D 1/0641 416/236 R |
| 2016/0305398 | A1 * | 10/2016 | Carroll | F03D 1/0675 |
| 2017/0138341 | A1 * | 5/2017 | Fukami | F03D 1/0683 |

FOREIGN PATENT DOCUMENTS

| | | | | |
|---|---|---|---|---|
| WO | WO-0015961 | A1 * | 3/2000 | ............ B64C 23/06 |
| WO | 01/16482 | A1 | 3/2001 | |
| WO | 02/08600 | A1 | 1/2002 | |
| WO | 2006/122547 | A1 | 11/2006 | |
| WO | 2008/113349 | A2 | 9/2008 | |
| WO | 2010/100237 | A2 | 9/2010 | |

OTHER PUBLICATIONS

Janiszewska, J.M.,"Three Dimensional Aerodynamics of a Simple Wing in Oscillation Including Effects of Vortex Generators Dissertation", (online), The Ohio State University, 2004.

Godard, G., et al.,"Control of a decelerating boundary layer, Part 1: Optimization of passive vortex generatiors", Aerospace Science and Technology, vol. 10, pp. 181-191, (2006), XP28033030A.

Kim D. H., et al.,"Predicting Unsteady Blade Loads of a Wind Turbine Using RANS and Vorticity Transport Methodologies", European Wind Energy Conference, Apr. 20, 2010-Apr. 23, 2010, Warsaw, Poland, XP009152918.

Savino, J.M., et al., "Wind Turbine Flow Visualization Studies", Proceedings: Windpower '85, Aug. 27-30, 1985, San Francisco, CA, pp. 559-564, XP009152928.

"Vortex Generators"(online), http://www.bcchapel.org/pages/0003/Vortex%20Generator.html, published before Apr. 2011.

Search Report from corresponding United Kingdom Application No. GB1202894.0, dated Apr. 27, 2012, nine (9) pages.

Peter Fuglsang, Stefano Bove, Wind Tunnel Testing of Airfoils Involves More Than Just Wall Corrections, LM Glasfiber, 2008, pp. 1-11.

G.W. Gyatt, Development and Testing of Vortex Generators for Small Horizontal Axis Wind Turbines, Jul. 1986, AeroVironment Inc. Prepared for National Aeronautics and Space Administration and US Department of Energy Conservation and Renewable Energy Wind/Ocean Technology Division, pp. 1-40.

\* cited by examiner

VORTEX GENERATOR ARRANGEMENT FOR AN AIRFOIL

This is a National Phase Application filed under 35 U.S.C. 371 as a national stage of PCT/EP2012/063915, filed on Jul. 16, 2012 and claims benefit to European Patent Application No. 11175052.7, filed on Jul. 22, 2011, and from European Application No. 11175051.9, filed Jul. 22, 2011, and from United Kingdom Application No. 1202894.0 filed Feb. 21, 2012, the entire content of each of which is hereby incorporated by reference in its entirety.

FIELD OF THE INVENTION

The present invention relates to an arrangement of vortex generators in an airfoil, in particular on a wind turbine blade.

BACKGROUND OF THE INVENTION

In wind turbine blade aerodynamics, boundary layer separation occurs when an airfoil profile experiences a relatively high angle of attack, which can cause a separation of attached airflow from the suction side of the airfoil. Such boundary layer separation results in a reduction in lift generated by the airfoil.

Vortex generators are used on wind turbine blades in order to induce turbulent airflow vortices as the aerodynamic profile of the blade is impacted upon by an incident airflow. The creation of these vortices acts to delay separation of the attached airflow from the aerodynamic profile, thereby improving blade performance for a wide range of angles of attack.

A 2006 paper by Godard et al. [G. Godard & M. Stanislas; *Control of a decelerating boundary layer. Part 1: Optimization of passive vortex generators; Aerospace Science and Technology* 10 (2006) 181-191] presents the optimum arrangement for a series of vortex generator pairs on an airfoil, and has been taken as the defined standard arrangement scheme.

Figure 4:
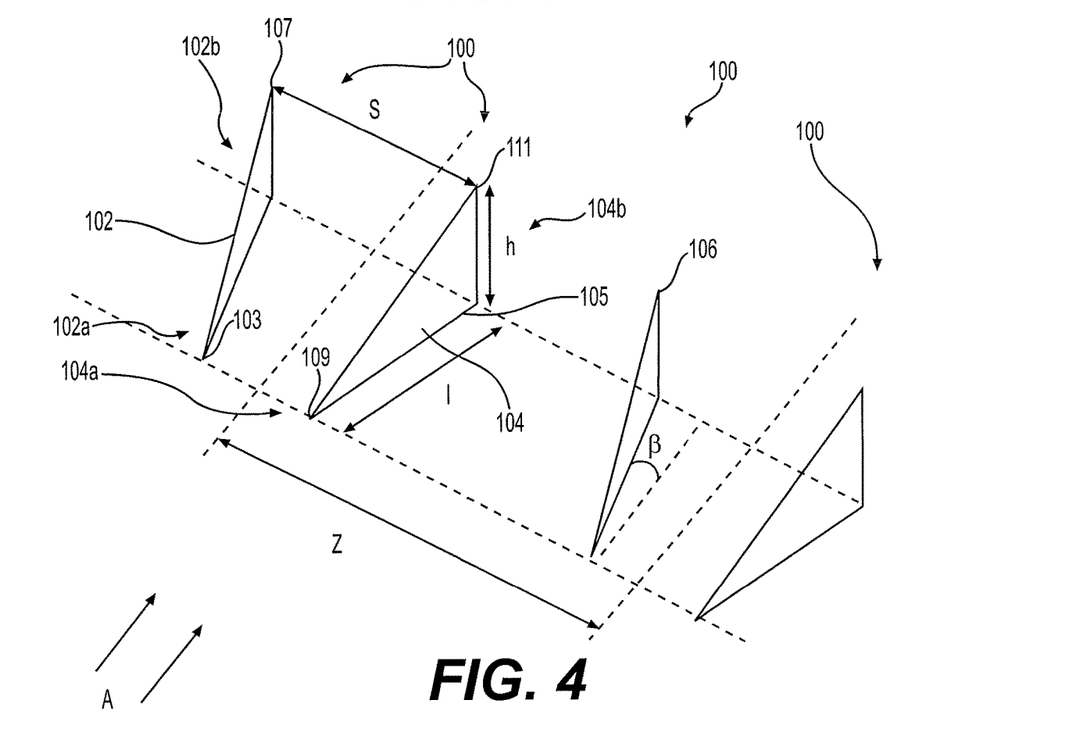
FIG. 4 shows an enlarged view of an arrangement of vortex generators according to the invention.

With reference to FIG. 4, Godard describes an array of pairs of triangular vortex generators or VGs 100 for use on an airfoil, e.g. a wind turbine blade. The pairs of VGs are arranged on the suction side of the airfoil, extending along at least a portion of the airfoil in the longitudinal direction. Each pair of VGs comprises a first vortex generator 102 and a second vortex generator 104 provided adjacent one another. The individual VGs 102,104 have a first end 102*a*, 104*a* arranged towards a leading edge of the airfoil and a second end 102*b*,104*b* arranged towards a trailing edge of the airfoil.

The VGs 102,104 have a right-angled triangle profile, a first leg of said triangular profile forming the base of the VG attached to the surface of the airfoil and a second leg of said triangular profile projecting from the base at the said second end of the VG. The hypotenuse of said profile extends from the first end of the VG at the base to the distal point of the second end of the VG.

The VGs 102,104 of each pair 100 are skewed from the direction of the incident flow (indicated by arrow A) on the airfoil by an angle β, measured from the respective first ends towards the second ends, such that the first ends of the adjacent VGs form a narrow, relatively convergent end of the VG pair, and that the second ends of the adjacent VGs form a wider, divergent end of the VG pair.

In the Godard study, where:
l is the length of the base of the VGs;
s is the distance between the respective second ends of first and second VGs in a VG pair;
h is the height of the second end of the VGs in a VG pair; and
z is the distance between the nominal centre lines between the first and second VGs of adjacent VG pairs,
the optimum performance for an airfoil having an array of VG pairs was found to have the following conditions:
l/h=2
s/h=2.5
z/h=6
β=18 degrees.

The Godard configuration of VG pairs has been accepted as the state of the art arrangement for vortex generator pairs on an airfoil.

SUMMARY OF THE INVENTION

As a result of experimentation, surprisingly an improved configuration of vortex generator pairs for an airfoil, in particular for a wind turbine blade, has been derived.

Accordingly, there is provided an arrangement of vortex generators (VGs) for use on an airfoil profile, preferably on a wind turbine blade, said airfoil profile having a leading edge and a trailing edge, said VGs provided as an array of pairs of VGs, said VGs comprising substantially triangular VG vanes projecting from a surface of said airfoil profile, each of said pairs comprising a first VG and a second VG, wherein said VGs comprise:

a first end provided towards said leading edge;
a second end provided towards said trailing edge;
a base extending between said first end and said second end adjacent the surface of the airfoil; and
a tip provided at the distal end of said triangular VG vane, wherein said VGs are skewed relative to the flow direction of the airfoil, and wherein
l is the length of the base of the VGs;
s is the distance between the respective second ends of first and second VGs in a VG pair;
h is the height from said surface of said tip of a VG in a VG pair;
z is the distance between nominal centre lines defined between the first and second VGs of adjacent VG pairs in the array; and
β is the angle of skew of the VGs relative to the flow direction of the airfoil, characterized in that:
l/h is between 1-5, preferably approximately 2;
s/h is between 4-15, preferably between 6-10, most preferably approximately 7;
z/h is between 7-20, preferably between 8-15, most preferably approximately 10; and
β is between 6-16 degrees, preferably between 9-13 degrees, most preferably approximately 12 degrees.

By arranging the vortex generators according to these ranges, there was a surprising improvement in airfoil performance when compared to the prior art. While variation of individual values and ratios was found to increase the drag generated by the vortex generators with respect to the prior art, a surprising effect was found for these ranges, wherein the proposed vortex generator arrangement acted to reduce the drag and increased the lift when compared with the prior art system.

Preferably, said VGs comprise right angle triangle VG vanes, wherein the hypotenuse of said vanes extends from the base at said first end to the distal tip at said second end.

Preferably, the VGs of said VG pairs are angled with regard to the flow direction over the airfoil. Preferably, the VGs of said VG pairs provided in a convergent arrangement at the first end of a VG pair.

Preferably, the first ends of the adjacent VGs form a narrow, relatively convergent end of the VG pair, and that the second ends of the adjacent VGs form a wider, divergent end of the VG pair.

Preferably, angle β is measured from the respective first ends towards the second ends.

There is further provided a wind turbine blade having an arrangement of vortex generators as described above, and a wind turbine having at least one such wind turbine blade.

In a further aspect, a method of fitting or retrofitting vortex generators on a wind turbine blade is provided, the wind turbine blade being mounted on a wind turbine hub and extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift. The method comprises identifying a separation line or one or more separation points on the suction side of the wind turbine blade, and mounting one or more vortex panels including a first vortex panel comprising at least one vortex generator on the suction side of the wind turbine blade between the separation line and the leading edge of the wind turbine blade.

The method according to the present invention enables provision of a wind turbine blade with improved aerodynamic properties thereby enabling a higher energy yield from the wind turbine with the respective wind turbine blade.

Identifying a separation line or one or more separation points on the suction side of the wind turbine blade may comprise determining at least one parameter indicative of flow properties in one or more measurement points or zones.

Preferably, mounting one or more vortex panels comprises mounting one or more vortex panels at a distance from the separation line in the range from 0.1 m to 1.5 m, e.g. in the range from 0.2 m to 1 m, such as about 0.5 m.

Preferably, identifying a separation line comprises determining the distribution of deposit on at least a section of the suction side of the wind turbine blade and identifying a separation line based on the distribution of deposit.

Preferably, the distribution of deposit is measured by determining at least one parameter indicative of the amount of deposit in a plurality of measurement points or zones on the suction side of the wind turbine.

Preferably, a first parameter indicative of the amount of deposit is the thickness of deposit in the measurement points or zones.

Preferably, a second parameter indicative of the amount of deposit is the colour of the measurement points or zones.

Preferably, identifying a separation line on the suction side of the wind turbine blade is performed when the wind turbine has been operated for at least one day.

Preferably, the method comprises:
applying a separation line indicator to the suction side of the wind turbine,
operating the wind turbine for a period of time, and
wherein identifying a separation line on the suction side of the wind turbine blade is based on the separation line indicator during or after operation of the wind turbine.

Preferably, the separation line indicator is a coating facilitating deposit of material on or removal of the coating during operation.

Preferably, the separation line indicator comprises pressure sensitive paint. Additionally or alternatively, the separation line indicator comprises powder.

Preferably, the separation line indicator comprises one or more tufts.

Preferably, identifying a separation line on the suction side of the wind turbine blade comprises identifying a separation line at a distance from the root end in the range from 0.1 L to 0.4 L, where L is the longitudinal length of the blade.

Preferably, identifying a separation line comprises determining the direction of wind flow in a plurality of measurement points or zones on the suction side of the wind turbine during operation and identifying a separation line based on the wind flow directions.

Preferably, the method comprises feeding the suction side flow with particles for deposit of the particles on the suction side surface and wherein identifying a separation line on the suction side of the wind turbine blade is based on the distribution of particle deposit on the suction side of the wind turbine blade.

In a further aspect, there is provided a wind turbine blade for a rotor of a wind turbine having a substantially horizontal rotor axis, the rotor comprising a hub from which the wind turbine blade extends substantially in a radial direction when mounted to the hub is provided, the wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift, wherein the suction side of the wind turbine blade is provided with a plurality of vortex generators positioned along a mounting line having a proximal end point nearest the root end and a distal end point nearest the tip end. The mounting line may be a concave line seen from the trailing edge of the wind turbine blade.

The wind turbine blade according to the present invention allows for a vortex generator configuration, where the vortex generators are arranged close to the area of possible or expected flow separation on the suction side of a corresponding wind turbine blade without the vortex generators, the flow separation being caused by the aerodynamic profile of the root region and the transition region. Accordingly, the wind turbine blade provides an improved separation profile by moving the separation towards the trailing edge or even preventing separation on the suction side of the wind turbine blade. At the same time, the induced drag from the vortex generators protruding from the suction side surface is minimised.

As the position of the separation line changes during different operating conditions, and the effect of the vortex generators is reduced with increased distance. It is desired that the vortex generators are positioned between the expected separation line and the leading edge in order to obtain the optimum effect. Further, it may be desired to arrange the vortex generators as far from the leading edge or as close to the trailing edge as possible in order to reduce or eliminate drag effects. The vortex generators are typically arranged between the expected separation line and the leading edge of the wind turbine blade.

A concave mounting line is to be understood as a line, which when projected into a chordal plane of the blade is concave, or equivalently that the mounting line may be concave from the trailing edge in a top view of the suction side of the blade. It is also understood that the plurality of vortex generators comprises a proximal vortex generator located at the proximal end point and a distal vortex generator located at the distal end point as well as at least one intermediate vortex generator between the proximal vortex generator and the distal vortex generator. Intermediate vortex generator(s) may be located at intermediate point(s) on the mounting line. In an embodiment, line segments of the mounting line, i.e. a part of the mounting line may be concave.

The plurality of vortex generators may comprise one or more sets of vortex generators, e.g. a first set of vortex generators positioned along a first line segment of the mounting line and/or a second set of vortex generators positioned along a second line segment of the mounting line. The plurality of vortex generators or set(s) of vortex generators, such as a first set of vortex generators positioned along a first line segment and/or a second set of vortex generators positioned along a second line segment, may comprise at least 10, at least 20, at least 30, at least 40 or at least 50 vortex generators.

The mounting line may follow the centre position of the vortex generators or alternatively the leading edge of the vortex generators. The mounting line or line segment(s) thereof may follow or substantially coincide with a line defining the shortest path between two points, e.g. between two intermediate points or between an end point and an intermediate point of the mounting line, along the suction side surface of the wind turbine blade.

The mounting line may extend along a part of the blade length. The mounting line may extend along 10% to 50% of the blade length, such as along 15% to 40%. In one or more embodiments, the mounting line extends along 20% to 35% of the blade length. The mounting line may form a smooth concave curve. However, in practice it can be cumbersome to arrange the vortex generators along a smooth concave curve, in particular since the vortex generators are often mounted on or via strips. Therefore, according to a particular advantageous embodiment, the concave mounting line is divided into two or more straight line segments.

The mounting line may comprise at least one intermediate point including a first intermediate point, wherein the at least one intermediate point divides the mounting line into a plurality of line segments including a first line segment and a second line segment. The first line segment may be straight and/or the second line segment may be straight. A straight line segment may be defined as a straight line in the chordal plane or equivalently that the line segment is straight in a top view of the suction side of the blade. Further, a straight line segment may be defined as the path defining the shortest distance between two points along the outer surface of the wind turbine blade.

In an additional or alternative aspect, there is provided a method for fitting or retrofitting a wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift is provided, the method comprising mounting a plurality of vortex generators along a mounting line having a proximal end point nearest the root end and a distal end point nearest the tip end. The mounting line may be a concave line seen from the trailing edge of the wind turbine blade. The method may comprise mounting vortex generators to provide a wind turbine as described herein.

Preferably, the mounting line extends along 10% to 50% of the blade length.

Preferably, the proximal end point is located in a blade length interval of 0-0.12 L or 0-0.10 L, or 0-0.08 L, or 0-0.6 L from the root end.

Preferably, the proximal end point is located in a relative chordal position of 2%-20%, or 3%-15%, or 5-15%, e.g. approx 10% from the leading edge.

Preferably, the distal end point is located in a blade length interval of 0.2 L to 0.5 L, or 0.25 L to 0.45 L, or 0.3 L to 0.4 L from the root end.

Preferably, the distal end point is located in a relative chordal position of 20%-80%, or 25%-70%, or 30-60%, e.g. approx 50% from the leading edge.

Preferably, a tangent to the proximal end point of the mounting line forms an angle with the pitch axis in the range from 0 to 10 degrees, or 0 to 5 degrees.

Preferably, a tangent to the distal end point of the mounting line forms an angle with the pitch axis in the range from 5 degrees to 45 degrees or 5 degrees to 35 degrees, such as 8 degrees.

Preferably, the mounting line comprises at least a first intermediate point dividing the mounting line into a straight first line segment and a second line segment.

Preferably, the first intermediate point is located in a blade length interval of 0.05 L to 0.30 L, or 0.08 L to 0.20 L, or 0.10 L to 0.17 L from the root end.

Preferably, the first intermediate point is located in a relative chordal position of 2%-20%, or 3%-15%, or 5-15%, e.g. approx 10% from the leading edge.

Preferably, the first line segment forms a first angle with the pitch axis in the range from 0 to 10 degrees.

Preferably, the second line segment is straight and forms a second angle with the pitch axis in the range from 2 degrees to 60 degrees or 5 to 45 degrees.

Preferably, the profiled contour is divided into:
a root region having a substantially circular or elliptical profile closest to the hub,
an airfoil region having a lift-generating profile furthest away from the hub, and
a transition region between the root region and the airfoil region, the transition region having a profile gradually changing in the radial direction from the circular or elliptical profile of the root region to the lift-generating profile of the airfoil region
wherein the mounting line extends along substantially the entire transition region of the blade.

Preferably, the profiled contour comprises a shoulder with a shoulder width and located at the boundary between the transition region and the airfoil region, wherein the shoulder is located in an interval of 0.15 L to 0.25 L, or 0.18 L to 0.25 L, or 0.19 L to 0.24 L from the root end.

Preferably, a distal vortex generator is located at the distal end point, the distal vortex generator comprising a base and a pair of vanes including a first vane and a second vane protruding from the base, wherein the first vane forms a first attack angle with the pitch axis in the range from 65 degrees to 80 degrees or from 70 degrees to 75 degrees.

There is also provided a method for retrofitting a wind turbine blade extending in a longitudinal direction along a pitch axis and having a tip end and a root end as well as a blade length, the wind turbine blade further comprising a profiled contour including a pressure side and a suction side, as well as a leading edge and a trailing edge with a chord having a chord length extending there between, the profiled contour, when being impacted by an incident airflow generating a lift, the method comprising mounting a plurality of vortex generators along a mounting line having a proximal end point nearest the root end and a distal end point nearest the tip end, wherein the mounting line is a concave line seen from the trailing edge of the wind turbine blade.

The wind turbine blade according to the invention provides improved flow on a wind turbine blade with improved aerodynamic properties thereby enabling a higher energy yield from the wind turbine with the respective wind turbine blade. In particular, a wind turbine blade with improved aerodynamic properties in the transition region and a first part of the airfoil region of the blade is provided.

It will be understood that any of the described features may be combined to provide a wind turbine blade having improved performance over the prior art.

DESCRIPTION OF THE INVENTION

An embodiment of the invention will now be described, by way of example only, with reference to the accompanying drawings, in which.

Figure 1:
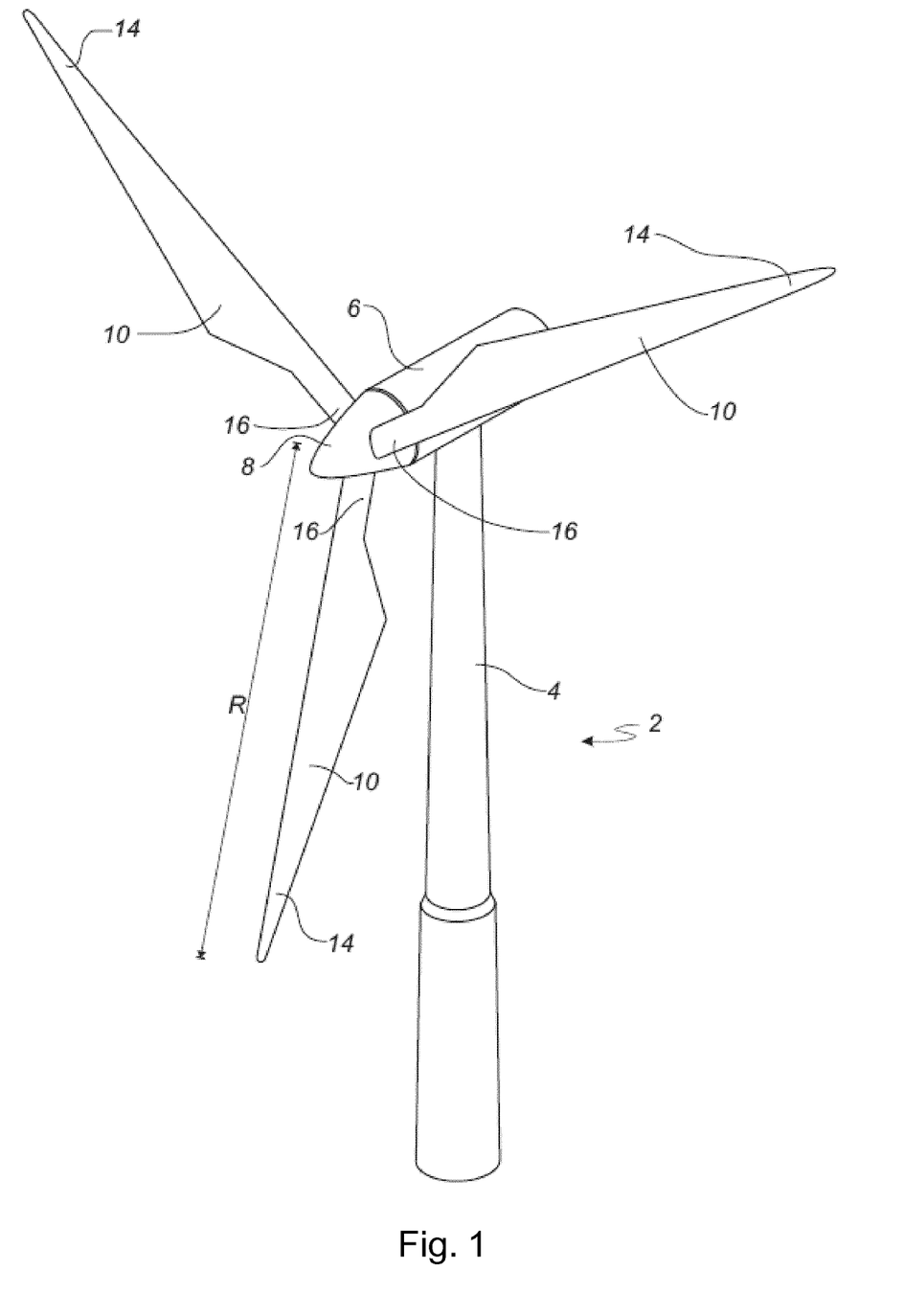
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

Figure 2:
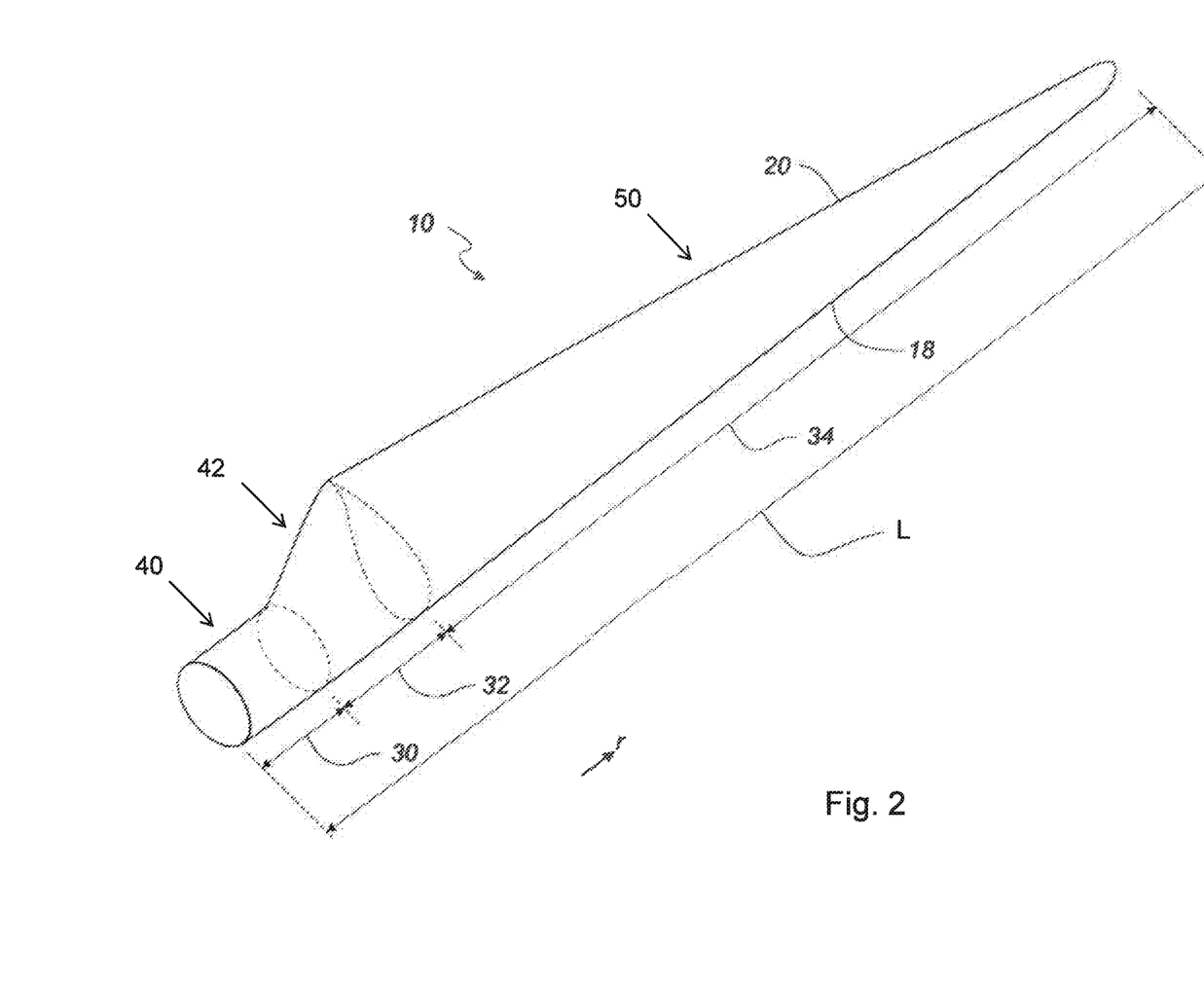
FIG. 2 shows a schematic view of a wind turbine blade according to the invention.

FIG. 2 shows a schematic view of a first embodiment of a wind turbine blade 10 according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
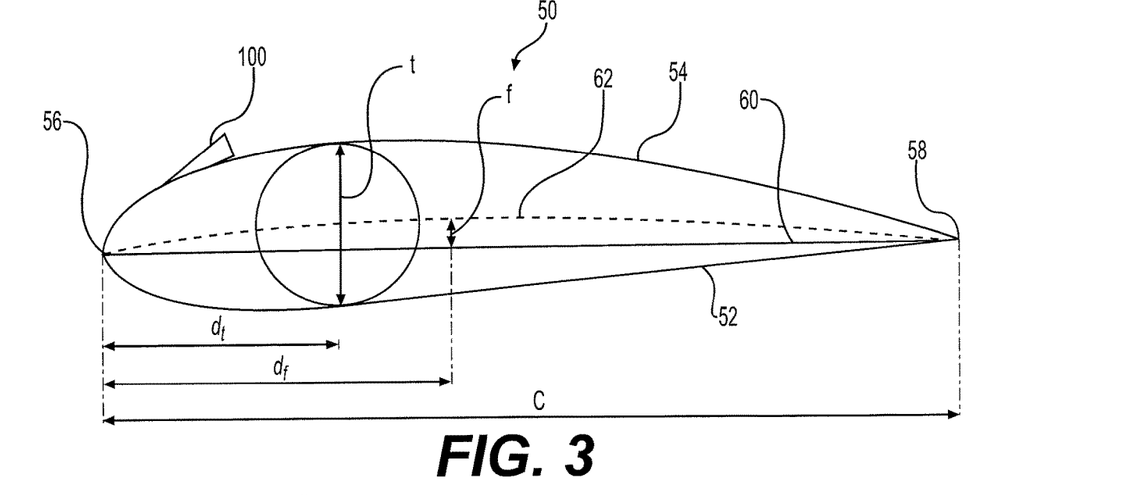
FIG. 3 shows a schematic view of an airfoil profile of the blade of FIG. 2.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Preferably, the wind turbine blades are longer than 30 metres between said root and tip ends, preferably longer than 40 metres.

An array of vortex generators 100 are provided on the suction side 54 of the airfoil 50, towards the leading edge 56. The vortex generators 100 act to induce turbulent vortices in the incident airflow over the airfoil 50, which prevent flow separation.

With reference to FIG. 4, the vortex generators (or VGs) 100 are provided as pairs of triangular VG vanes 100 for use on an airfoil, e.g. a wind turbine blade. The pairs of VGs are arranged on the suction side of the airfoil, extending along at least a portion of the airfoil in the longitudinal direction, i.e. along the direction of radius R. Each pair of VGs comprises a first vortex generator 102 and a second vortex generator 104 provided adjacent one another. The individual VGs 102,104 have a first end 102a,104a arranged towards a leading edge 56 of the airfoil and a second end 102b,104b arranged towards a trailing edge 58 of the airfoil.

The VGs 102, 104 have a right-angled triangle profile, a first leg of said triangular profile forming the base 105 of the VG attached to the surface of the airfoil and a second leg of said triangular profile projecting from the base at the said second end 102b, 104b of the VG, having height h. The hypotenuse of said profile extends from the first end 102a, 104a of the VG at the base (i.e., point 103 of VG 102 and point 109 of VG 104) to the distal point, or tip, of the second end 102b, 104b of the VG (i.e., to point 107 of VG 102 and point 111 of VG 104). However, it will be understood that other VG constructions may be used, and the invention is not limited to a right-angled triangle profile.

The VGs 102,104 of each pair 100 are skewed from the direction of the incident flow (indicated by arrows A) on the airfoil by an angle β, measured from the respective first ends towards the second ends, such that the first ends of the adjacent VGs form a narrow, relatively convergent end of the VG pair, and that the second ends of the adjacent VGs form a wider, divergent end of the VG pair.

Through variation of the characteristic dimensions of the VGs, a surprising improvement in aerodynamic performance was achieved. In particular, with regard to the dimensions of:
- the inter-vane distance s between the second ends 102b, 104b of VGs in a VG pair;
- the length l of the base of the triangular VG vane 100;
- the height h of the tip end of the VG vanes, provided at the second end 102b,104b of the VGs;
- the inter-pair distance z measured between nominal centre lines extending between the VGs of adjacent VG pairs; and
- the offset angle β—measured as the angle at which a VG vane extends with respect to the direction of inflow at the vortex generators.

In comparison to the state of the art described in Godard, while having an l/h ratio of between 4-15, by increasing the ratio of s/h to between 4-15, increasing the ratio of z/h to between 7-20, and reducing β to between 6-16 degrees, a surprising improvement in aerodynamic performance was discovered, resulting in an improved configuration of vortex generator pairs on an airfoil.

While individually any one of the above described adjustments to the vortex generator arrangement would result in an increase in drag and a negative impact on aerodynamic performance, the combination of these feature adjustments presents an improvement over the prior art, which is not thought or suggested in the state of the art.

The following table illustrates the improvement in performance obtained from two embodiments according to the proposed arrangement, in comparison to two prior art constructions, according to the accepted state of the art configuration (taken from Godard et al.). The results are illustrated for the starting condition wherein l/h=2, with the results of the proposed arrangement denoted "LM Wind Power". In the table the maximum values of the polars and other significant values are given.

TABLE 1

Experimental results

| Optimum VC parameter configuration | β [*] | z/h [-] | s/h [-] | $c_{L,max}$ [-] | $AOA_{Stall}$ [*] | $\left(\dfrac{c_L}{c_D}\right)_{max}$ [-] | $AOA_{Des}$ [*] | $c_{L,Design}$ [-] | $c_{D,Design}$ [-] |
|---|---|---|---|---|---|---|---|---|---|
| LM Wind Power | 9 | 10 | 7 | 1.81 | 13.9 | 117.6 | 6.1 | 1.12 | 0.0095 |
|  | 12 | 10 | 7 | 1.81 | 13.4 | 118.1 | 7.1 | 1.24 | 0.0105 |
| Godard | 18 | 5 | 2 | 1.66 | 12.4 | 86.1 | 7.1 | 1.22 | 0.0142 |
|  | 18 | 7.5 | 3 | 1.71 | 12.7 | 94.9 | 7.1 | 1.23 | 0.0130 |

It can be seen that the proposed arrangement of vortex generator pairs, having a relatively smaller angle β, larger z/h and s/h ratios, results in an increase in $C_{Lmax}$, the maximum lift coefficient for the airfoil, over the Godard system. Additionally, the ($C_L/C_D$) ratio is increased relative to Godard, and the airfoil will only enter stall at a higher angle of attack (AOA).

With reference to FIGS. 5-8, a series of illustrative plots are provided showing experimental results involving the embodiments of the invention described in the above table in comparison to the state of the art proposed in Godard. The individual plots are denoted VG_A_S_Z, wherein A is the β angle used, S is the s/h ratio, and Z is the z/h ratio. Accordingly, the plots denoted VG_A12_S7.0_Z10 and VG_A9_S7_Z10 are indicative of a vortex generator configuration according to the invention, and the plots VG_A18_S2.0_Z5 and VG_A18_S3.0_Z7.5 are indicative of prior art vortex generator configurations, with reference to the above Table 1.

The experimental investigations of the effect of the vortex generator configuration on the maximum lift coefficient, $C_{l,max}$ and on maximum glide ratio, $(C_l/C_d)_{max}$, have been carried out in the LM Wind Power wind tunnel on a DU 91-W2-250 profile, which is a wind turbine dedicated airfoil developed at Delft University of Technology [W. A. Timmer & R. P. J. O. M. van Rooij; *Summary of the Delft University Wind Turbine Dedicated Airfoils; ASME Journal of Solar Energy* 125 (2003) 488-496]. The Reynolds number for the presented results is 3 million.

By way of comparison to the experimental results, the performance of the airfoil used without any vortex generators is also shown in FIGS. 5-8, by the plot denoted 'Clean'.

Figure 5:
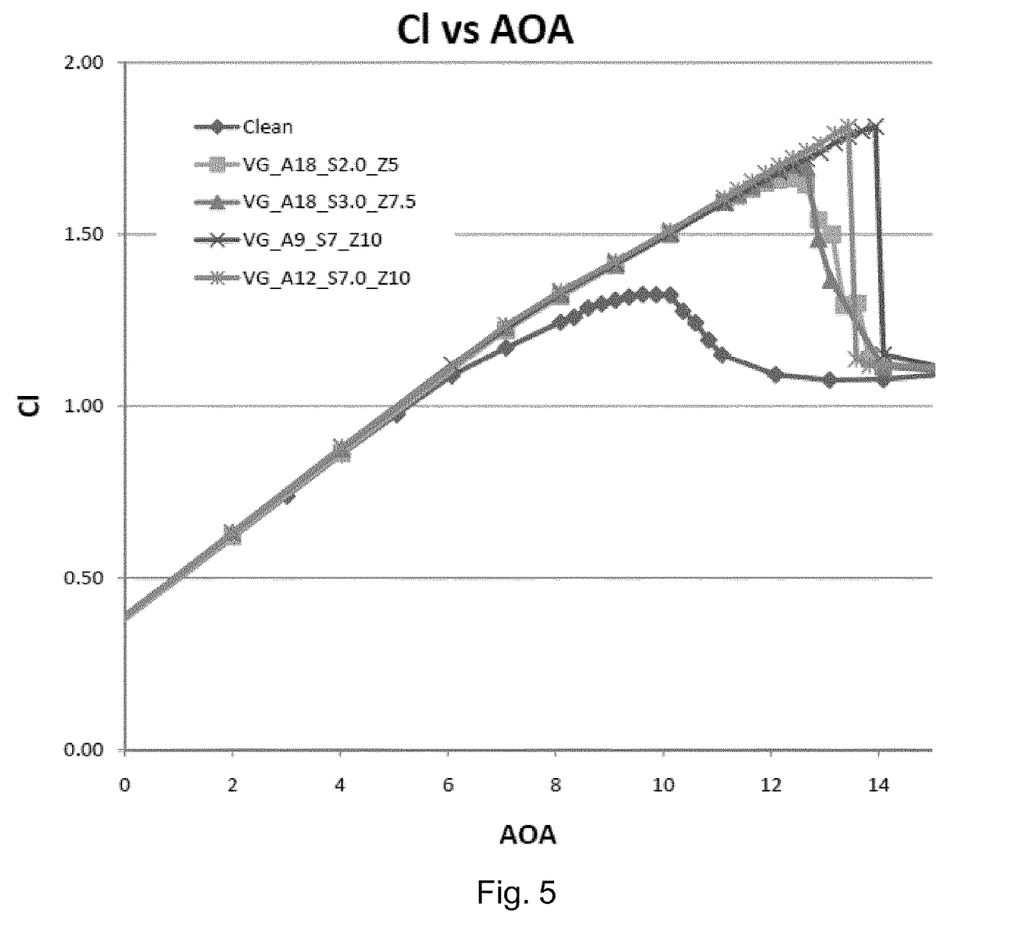
FIG. 5 shows a plot of the lift coefficient against the angle of attack from experimental results of two embodiments of the invention in comparison with prior art systems.

In FIG. 5, a plot is shown of the lift coefficient $C_l$ against angle of attack AOA. Here it can be seen that the prior art systems (indicated in the plots denoted by the X and by the triangle) experience a reduction in the $C_l$ provided by the airfoil at an earlier AOA in comparison to the embodiments of the invention, i.e. the system of the invention will surprisingly enter stall at a later angle of attack than the prior art systems.

Figure 6:
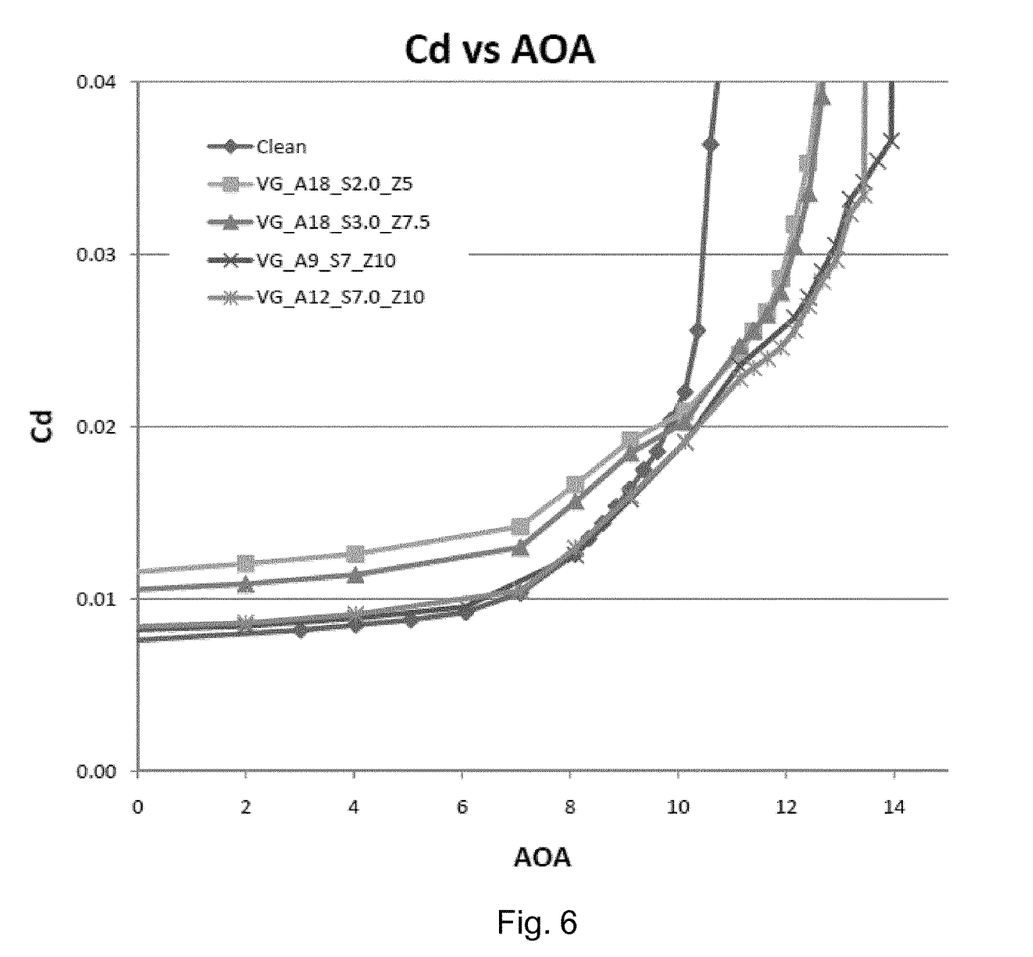
FIG. 6 shows a plot of the drag coefficient against the angle of attack from experimental results of two embodiments of the invention in comparison with prior art systems.

In FIG. 6, a plot is shown of the drag coefficient $C_d$ against angle of attack AOA. Here it can be seen that the prior art systems (indicated in the plots denoted by the X and by the triangle) experience a greater overall $C_d$ across all AOAs in comparison to the embodiments of the invention, and accordingly the proposed invention provides an improvement in the drag performance of the airfoil.

Figure 7:
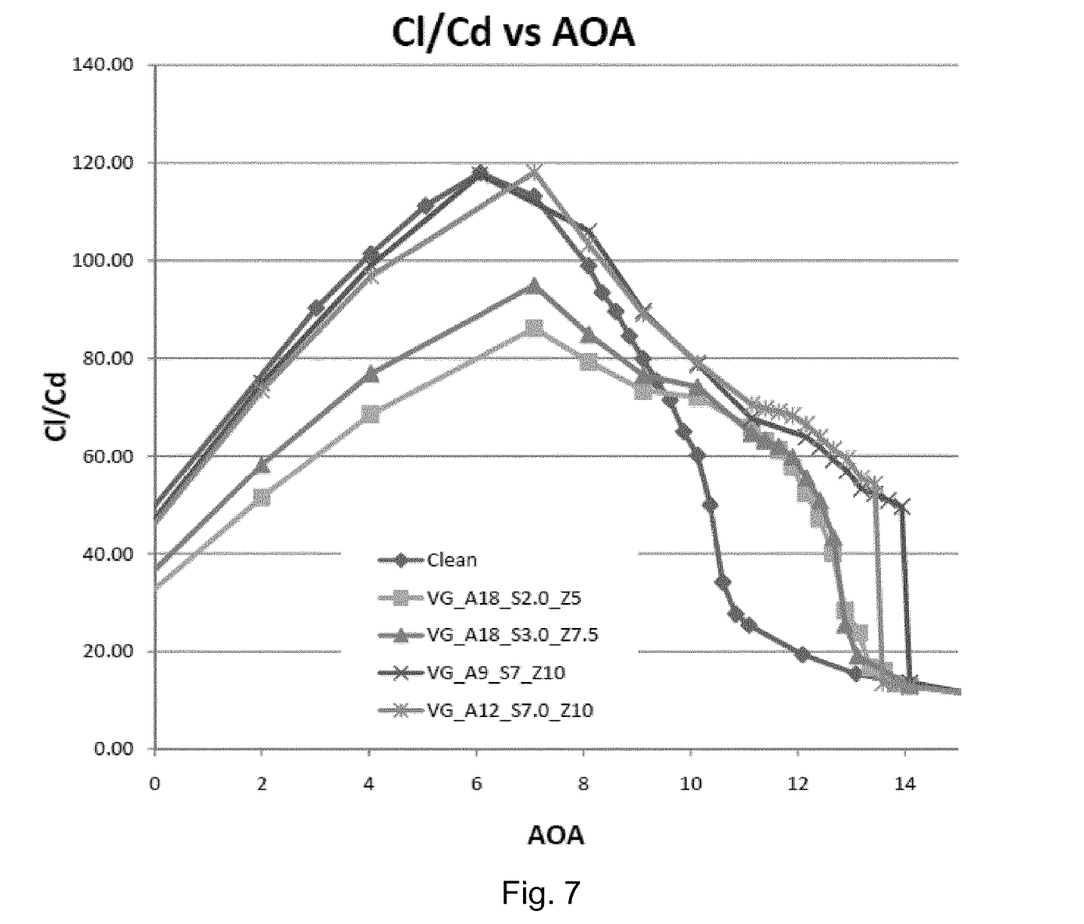
FIG. 7 shows a plot of the (lift coefficient/drag coefficient) against the angle of attack from experimental results of two embodiments of the invention in comparison with prior art systems and FIG. 8 shows a plot of the lift coefficient against the drag coefficient from experimental results of two embodiments of the invention in comparison with prior art systems.
Figure 8:
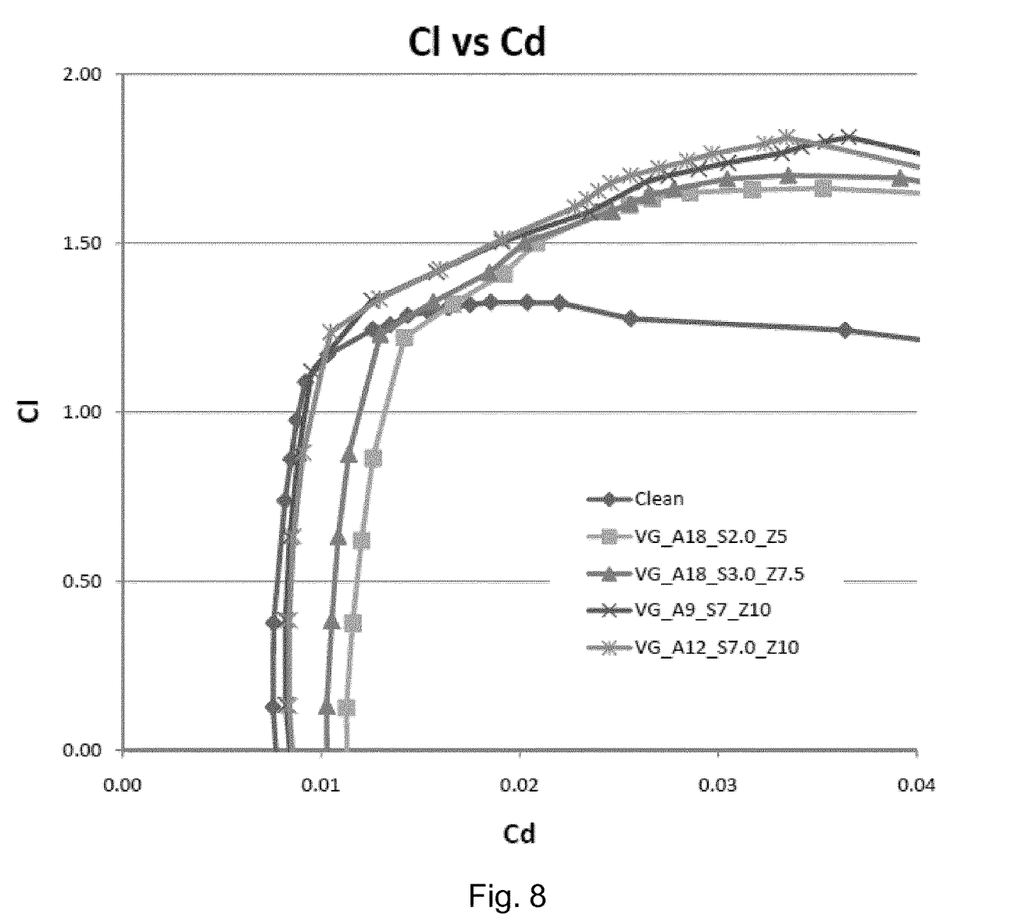

In FIG. 7, a plot is shown of $(C_l/C_d)$ against angle of attack AOA, while in FIG. 8 $C_l$ is plotted against the $C_d$ for the tested systems. It is clear that the embodiments of the system of the invention provide a significant and surprising improvement in the lift-to-drag ratio over the prior art systems, resulting in an improvement in overall airfoil performance.

Further testing has indicated to the inventors that the performance advantages indicated in the above table and the accompanying figures extend across the proposed range of characteristic values.

It will be understood that the VGs may have any suitable structure and cross-section. The VGs are substantially planar, or at least a portion of the VGs may be tapered, e.g. a tapered second end 102b,104b, or a tapered tip end.

Such a system provides an improved performance when installed on a wind turbine blade, resulting in greater energy production for such a wind turbine blade over the prior art systems. Initial calculations have shown that blades having such an arrangement of vortex generators will experience an increase in AEP (Annual Energy Production) of between approximately 0.3%-1% over the lifetime of the blade.

The arrangement comprises at least 2 VG pairs. The arrangement of VG pairs may be provided along a straight line, a curved line, and/or a multi-part line in the longitudinal direction of the blade. The VG pairs may be arranged substantially equidistantly.

It will be understood that the individual VG pairs may be provided having a separate or a common base. Furthermore, the individual vanes of the VG pairs may also be provided having a separate or a common base for the VG pair. In addition, it will be understood that the invention also covers the VG arrangement wherein a first vane of a first VG pair and a second vane of an adjacent second VG pair may be provided on a common base, wherein the VG pairs of the invention are defined by adjacent vanes of adjacent VG elements or modules.

The herein described embodiments present an array of vortex generator pairs for use on an airfoil, preferably a wind turbine blade. The arrangement of vortex generators in a manner different to that thought by the prior art presents a surprising improvement in aerodynamic performance over the prior art systems.

The invention is not limited to the embodiment described herein, and may be modified or adapted without departing from the scope of the present invention.

The invention claimed is:

1. A wind turbine blade having an airfoil profile, the wind turbine blade comprising an arrangement of vortex generators, said airfoil profile having a leading edge and a trailing edge, said vortex generators provided as an array of pairs of vortex generators, said vortex generators comprising substantially triangular vortex generator vanes projecting from a surface of said airfoil profile of said wind turbine blade, each of said pairs comprising a first vortex generator and a second vortex generator, wherein said first and second vortex generators each comprise:
   a first leading edge end provided towards said leading edge;
   a second trailing edge end provided towards said trailing edge;
   a base extending between said first leading edge end and said second trailing edge end adjacent the surface of the airfoil profile; and
   a tip distal end of each said substantially triangular vortex generator vane provided near said second trailing edge end, wherein said first and second vortex generators are skewed relative to a main flow direction of the airfoil profile, wherein the first leading edge ends of the first and second vortex generators form a narrow, relatively convergent end of a pair, and that the second trailing edge ends of the first and second vortex generators form a wider, divergent end of the pair, and wherein
   l is a length of the base of the first and second vortex generators;
   s is a distance between the respective second trailing edge ends forming the wider, divergent end of the first and second vortex generators in the pair;
   h is a height from said base to a surface of said distal end of the first or second vortex generator in the pair;
   z is a distance between nominal center lines defined between the first and second vortex generators of adjacent pairs in the array; and
   β is an angle of skew of the first and second vortex generators relative to the main flow direction of the airfoil profile,
   wherein:
   l/h is between 1-5,
   s/h is between 6-15;
   z/h is between 7-20; and
   β is between 6-12 degrees, whereby s/h is selected to reduce drag and increase lift.

2. The wind turbine blade of claim 1, wherein said vortex generators comprise right angle triangle vortex generator vanes, wherein a hypotenuse of said right angle triangle vortex generator vanes extends from the base at said first end to the distal end at said second end.

3. The wind turbine blade of claim 1, wherein l/h is 2.

4. The wind turbine blade of claim 1, wherein s/h is between 6-10.

5. The wind turbine blade of claim 4, wherein s/h is 7.

6. The wind turbine blade of claim 1, wherein z/h is between 8-15.

7. The wind turbine blade of claim 6, wherein z/h is 10.

8. The wind turbine blade of claim 1, wherein β is between 9-12 degrees.

9. The wind turbine blade of claim 8, wherein β is 12 degrees.

10. The wind turbine blade of claim 1, wherein the angle β is measured from the respective first ends towards the second ends.

11. The wind turbine blade of claim 1, wherein said wind turbine blade has a length greater than 30 metres.

12. A wind turbine having at least one wind turbine blade as claimed in claim 1.

13. The wind turbine blade of claim 1, wherein s/h is between 7-15.

14. The wind turbine blade of claim 13, wherein z/h is between 8-20.

15. The wind turbine blade of claim 1, wherein z/h is between 8-20.

16. The wind turbine blade of claim 1, wherein l/h is between 2-5.

17. The wind turbine blade of claim 1, wherein z/h is between 7-10.

18. A wind turbine blade having an airfoil profile, the wind turbine blade comprising an arrangement of vortex generators, said airfoil profile having a leading edge and a trailing edge, said vortex generators provided as an array of pairs of vortex generators, said vortex generators comprising substantially triangular vortex generator vanes projecting from a surface of said airfoil profile of said wind turbine blade, each of said pairs comprising a first vortex generator and a second vortex generator, wherein said first and second vortex generators each comprise:

a first leading edge end provided towards said leading edge;

a second trailing edge end provided towards said trailing edge;

a base extending between said first leading edge end and said second trailing edge end adjacent the surface of the airfoil profile; and a tip distal end of each said substantially triangular vortex generator vane provided near said second trailing edge end, wherein said first and second vortex generators are skewed relative to a main flow direction of the airfoil profile, wherein the first leading edge ends of the first and second vortex generators form a narrow, relatively convergent end of a pair, and that the second trailing edge ends of the first and second vortex generators form a wider, divergent end of the pair, and wherein l is a length of the base of the first and second vortex generators;

s is a distance between the respective second trailing edge ends forming the wider, divergent end of the first and second vortex generators in the pair;

h is a height from said base to a surface of said distal end of the first or second vortex generator in the pair;

z is a distance between nominal center lines defined between the first and second vortex generators of adjacent pairs in the array; and β is an angle of skew of the first and second vortex generators relative to the main flow direction of the airfoil profile, wherein:

l/h is between 1-5, s/h is between 7-15;

z/h is between 7-20; and

β is between 6-16 degrees, whereby s/h is selected to reduce drag and increase lift.

19. A wind turbine blade having an airfoil profile, the wind turbine blade comprising an arrangement of vortex generators, said airfoil profile having a leading edge and a trailing edge, said vortex generators provided as an array of pairs of vortex generators, said vortex generators comprising substantially triangular vortex generator vanes projecting from a surface of said airfoil profile of said wind turbine blade, each of said pairs comprising a first vortex generator and a second vortex generator, wherein said first and second vortex generators each comprise:

a first leading edge end provided towards said leading edge;

a second trailing edge end provided towards said trailing edge;

a base extending between said first leading edge end and said second trailing edge end adjacent the surface of the airfoil profile; and a tip distal end of each said substantially triangular vortex generator vane provided near said trailing edge second end, wherein said first and second vortex generators are skewed relative to a main flow direction of the airfoil profile, wherein the first leading edge ends of the first and second vortex generators form a narrow, relatively convergent end of a pair, and that the second trailing edge ends of the first and second vortex generators form a wider, divergent end of the pair, and wherein l is a length of the base of the first and second vortex generators;

s is a distance between the respective second trailing edge ends forming the wider, divergent end of the first and second vortex generators in the pair;

h is a height from said base to a surface of said distal end of the first or second vortex generator in the pair;

z is a distance between nominal center lines defined between the first and second vortex generators of adjacent pairs in the array; and β is an angle of skew of the first and second vortex generators relative to the main flow direction of the airfoil profile, wherein:

l/h is between 1-5, s/h is between 6-15;

z/h is between 8-20; and

β is between 6-16 degrees, whereby s/h is selected to reduce drag and increase lift.

* * * * *